(12) United States Patent
Latschaw et al.

(10) Patent No.: US 10,194,653 B2
(45) Date of Patent: Feb. 5, 2019

(54) WATERFOWL DECOY HAVING OSCILLATING WINGS

(71) Applicant: The Clone, LLC, Sherwood, OR (US)

(72) Inventors: Ron Latschaw, Meridian, OR (US); Dean A. Klein, Eagle, ID (US)

(73) Assignee: The Clone, LLC, Sherwood, OR (US)

( * ) Notice: Subject to any disclaimer, the term of this patent is extended or adjusted under 35 U.S.C. 154(b) by 357 days.

(21) Appl. No.: 15/222,874

(22) Filed: Jul. 28, 2016

(65) Prior Publication Data

US 2017/0027160 A1 Feb. 2, 2017

Related U.S. Application Data

(60) Provisional application No. 62/200,006, filed on Aug. 1, 2015.

(51) Int. Cl.
*A01M 31/06* (2006.01)
(52) U.S. Cl.
CPC .................................. *A01M 31/06* (2013.01)
(58) Field of Classification Search
CPC ...................................................... A01M 31/06
USPC ........................................................ 43/2, 3
See application file for complete search history.

(56) References Cited

U.S. PATENT DOCUMENTS

| | | | |
|---|---|---|---|
| 2,480,390 A * | 8/1949 | Thompson ............ | A01M 31/06 43/3 |
| 2,691,233 A | 10/1954 | Richardson | |
| 2,747,314 A * | 5/1956 | McGregor ............ | A01M 31/06 43/3 |
| 2,849,823 A * | 9/1958 | Miller .................... | A01M 31/06 43/3 |
| 4,896,448 A | 1/1990 | Jackson | |
| 6,170,188 B1 * | 1/2001 | Mathews ............... | A01M 31/06 43/3 |
| 6,339,893 B1 * | 1/2002 | Solomon ............... | A01M 31/06 43/3 |
| 6,508,028 B1 | 1/2003 | Crowe | |
| 6,574,903 B2 | 6/2003 | Solomon | |
| 7,225,579 B2 * | 6/2007 | Haley .................... | A01M 31/06 43/3 |
| 9,144,236 B2 * | 9/2015 | Price ...................... | A01M 31/06 |
| 9,258,993 B2 * | 2/2016 | Szechenyi ............... | F16H 21/44 |
| 9,538,744 B1 * | 1/2017 | Campbell .............. | A01M 31/06 |

* cited by examiner

*Primary Examiner* — David J Parsley
(74) *Attorney, Agent, or Firm* — Brian Beverly; Beeson Skinner Beverly, LLP (57) ABSTRACT

A waterfowl decoy having oscillating wings includes an oscillation mechanism having an anchor plate fixedly disposed in the interior cavity of a waterfowl decoy body, first and second wing gears pivotally attached to the surface of the anchor plate, the wing gears intermeshed such that pivoting movement of one causes corresponding counter-pivoting movement in the other, a drive wheel and link for reciprocally pivoting the first wing gear within a defined arc, and a pair of wings attached to the wing gears and extending outwardly from the decoy body, such that reciprocating movement of the wing gears causes the wings to oscillate in a motion resembling that of the flapping wings of a bird in flight.

18 Claims, 11 Drawing Sheets

WATERFOWL DECOY HAVING OSCILLATING WINGS

CROSS-REFERENCE TO RELATED APPLICATIONS

This application claims the benefit of U.S. Provisional Application No. 62/200,006, filed Aug. 1, 2015.

BACKGROUND

Field of the Invention

The invention is directed to waterfowl decoys having moveable wings and particularly to waterfowl decoys having a harmonic oscillation mechanism for moving the wings of the decoy in a reciprocal motion resembling the wing beat of a waterfowl.

Discussion of the Prior Art

Waterfowl decoys are commonly deployed while hunting waterfowl to lure waterfowl within range. Many and varied attempts have been made to create waterfowl decoys that realistically emulate the appearance and action of live waterfowl. For example, a recent innovation provides a decoy with spinning wings which creates the illusion of the beating wings of a landing bird. Other decoys depend on wind to effect motions which it simulate lifelike wing movements. Despite these efforts, heretofore it has proved to be difficult and elusive to simulate realistically the complex flapping motion of a waterfowl's wings.

DETAILED DESCRIPTION OF THE ILLUSTRATED EMBODIMENTS

Figure 1A:
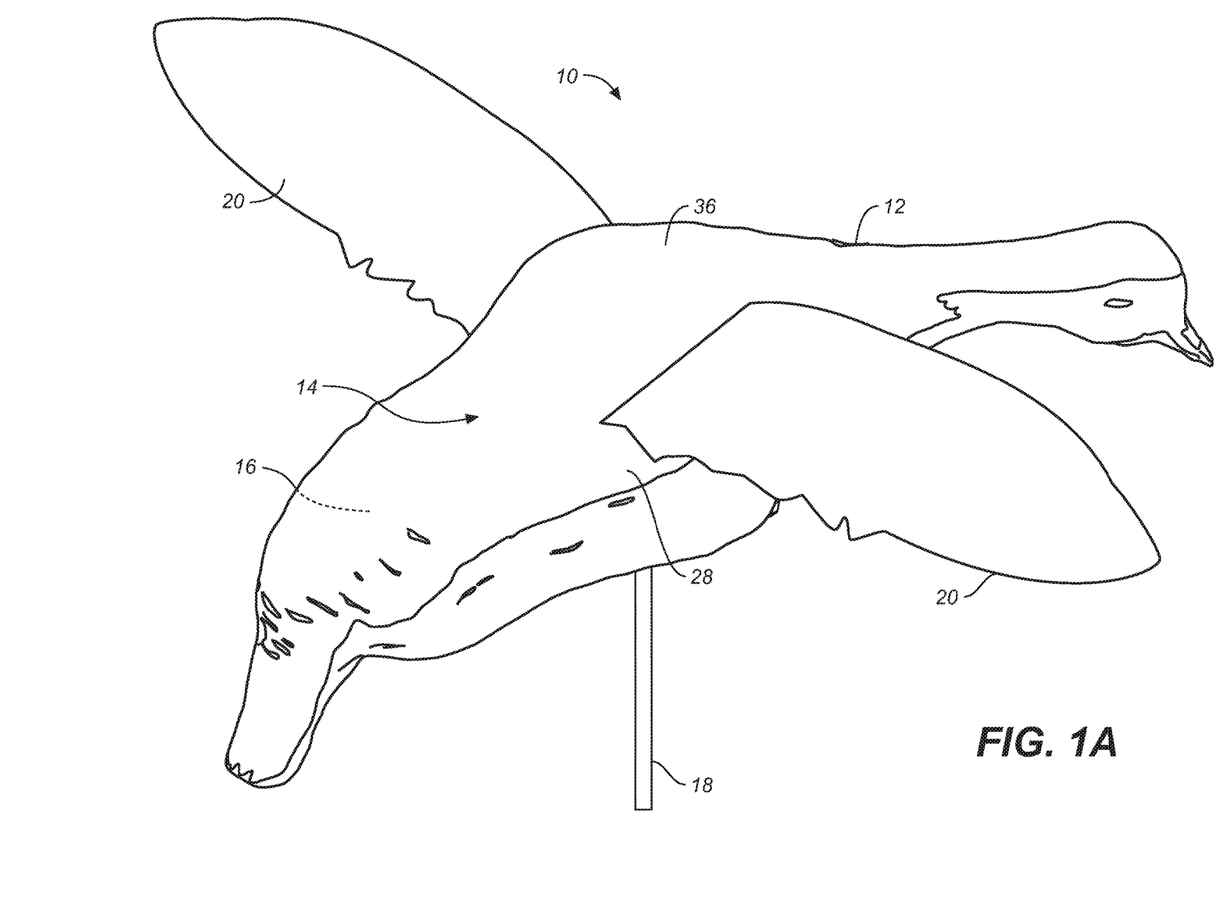
FIG. 1A is an upper perspective view of a waterfowl decoy having oscillating wings according to the invention.
Figure 1B:
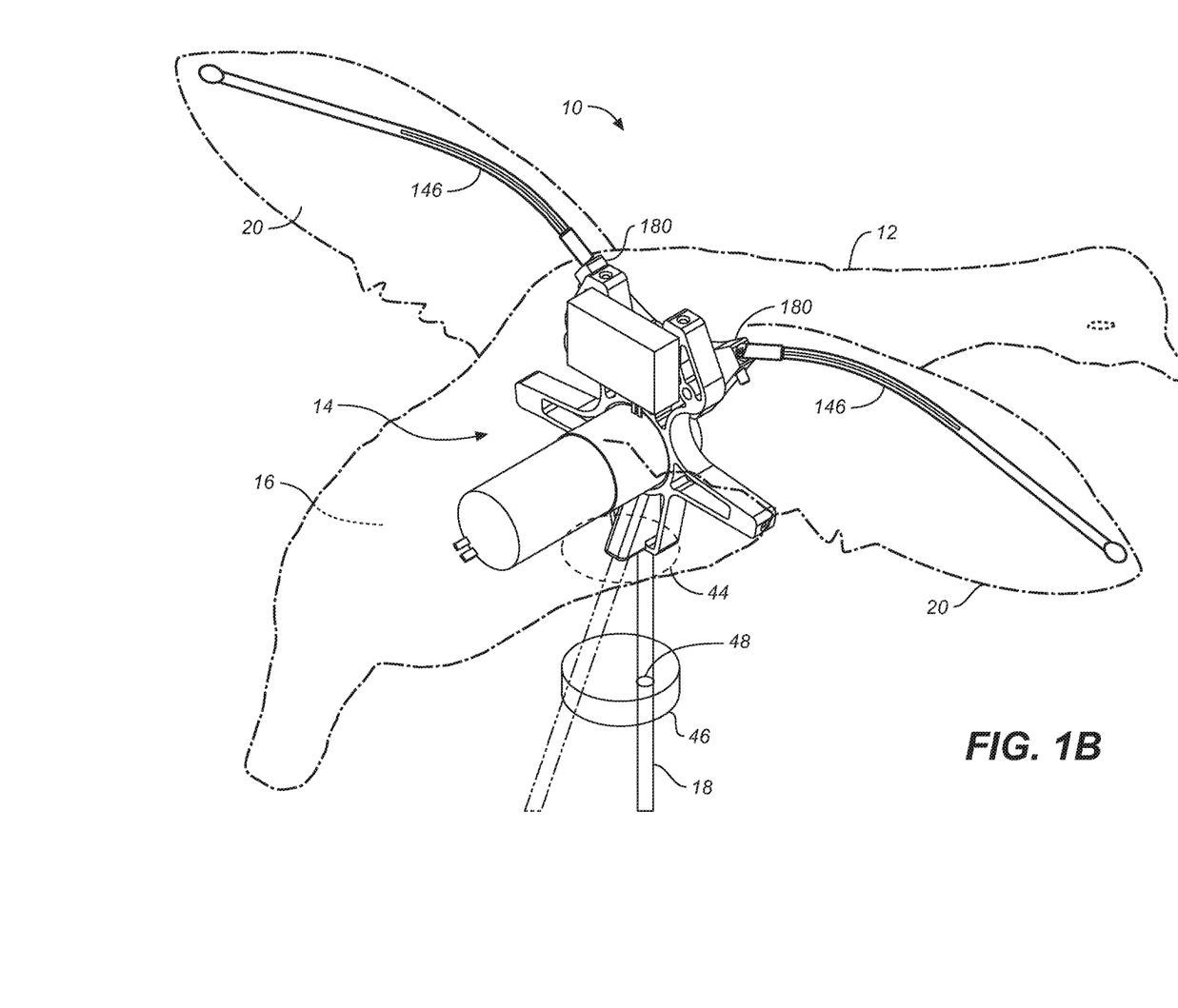
FIG. 1B is an upper perspective thereof with the decoy body shown in broken lines to reveal the oscillation mechanism and internal components of the wings.

A waterfowl decoy having oscillating wings, referred to generally at numeral 10 in FIGS. 1A and 1B, comprises a decoy body 12 having a shape resembling the body of a waterfowl in a downwardly arced landing posture. An oscillation mechanism 14 is anchored in the interior cavity 16 of the decoy body. The decoy body 12 and oscillating mechanism 14 are held in an elevated position above a support surface by support rod 18. A pair of wings 20 are operatively attached to the oscillating mechanism and to the decoy body 12 such that when the oscillating mechanism is activated the wings 20 move reciprocally up and down in a life-like flapping motion.

Figure 2:
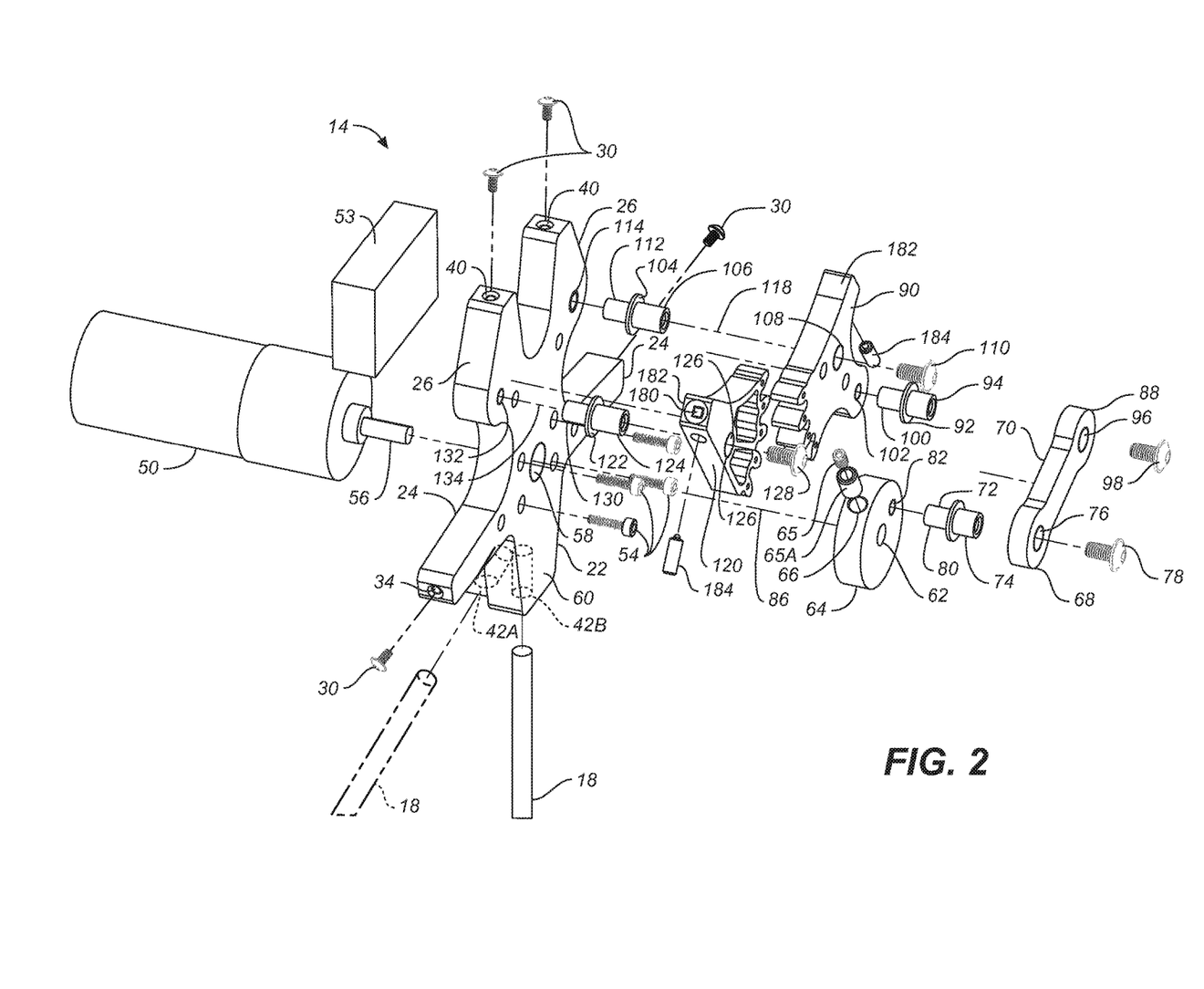
FIG. 2 is an upper right perspective view of the oscillation mechanism thereof.
Figure 6A:
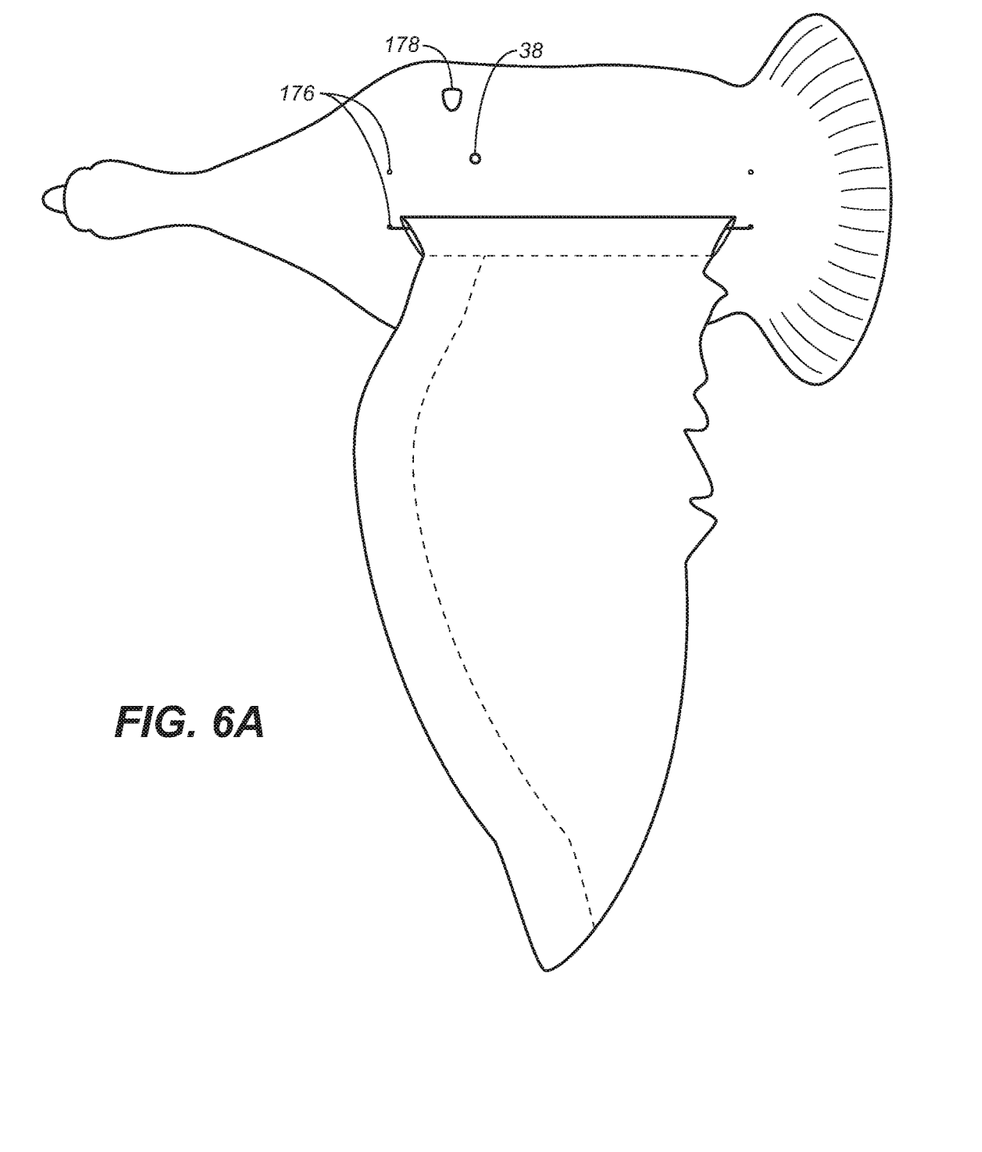
FIG. 6A is a top plan view of the decoy body thereof showing one attached to the body.
Figure 6B:
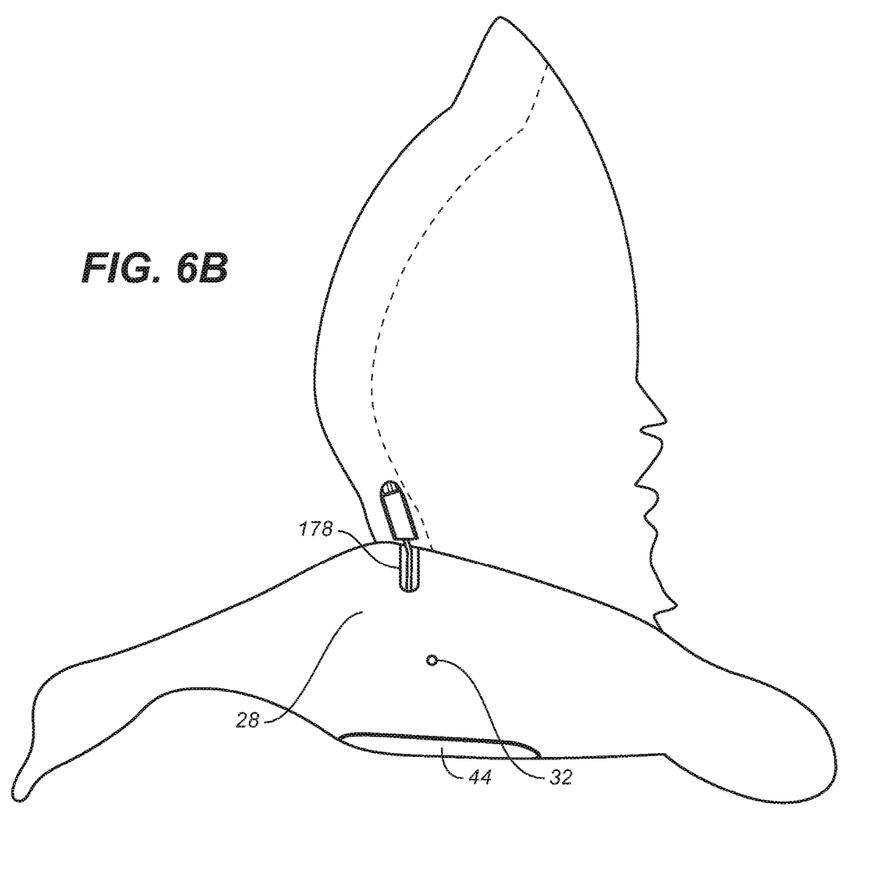
FIG. 6B is a side elevation view of the decoy body and wing seen in FIG. 6A showing the wing in a raised posture.
Figure 7A:
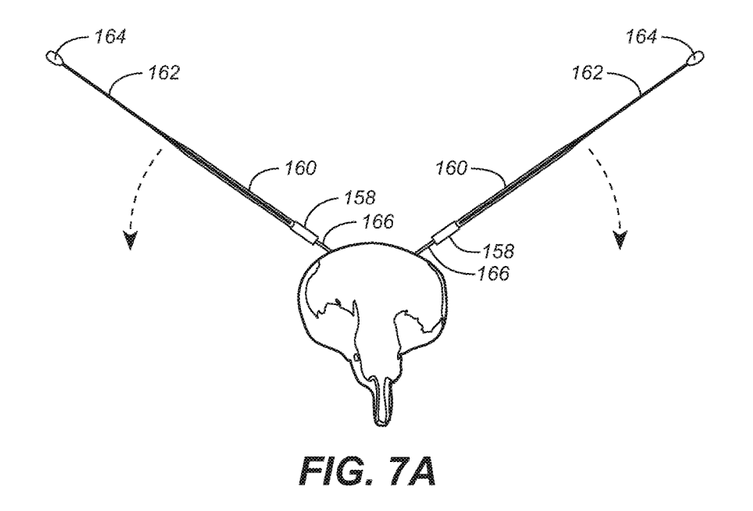
FIG. 7A is a front elevation view thereof showing the wings raised at an angle to the body and moving downward.
Figure 7B:
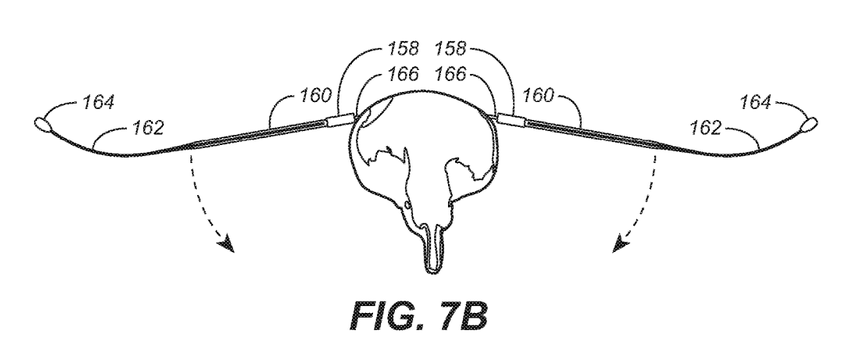
FIG. 7B is a front elevation view thereof showing the wings to the side of the body and continuing their downward movement.
Figure 7C:
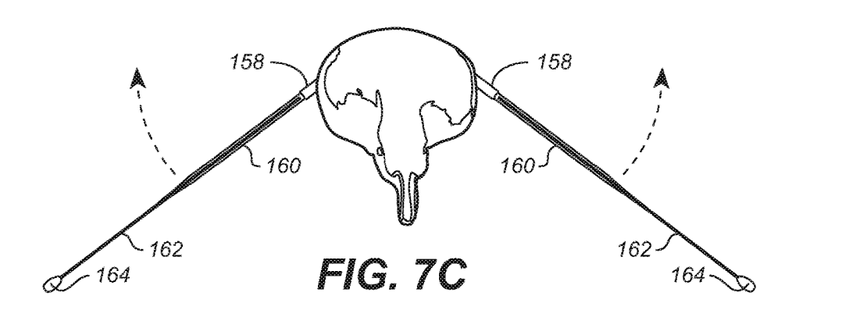
FIG. 7C is a front elevation view thereof showing the wings to lowered at an angle to the body but moving upward.
Figure 7D:
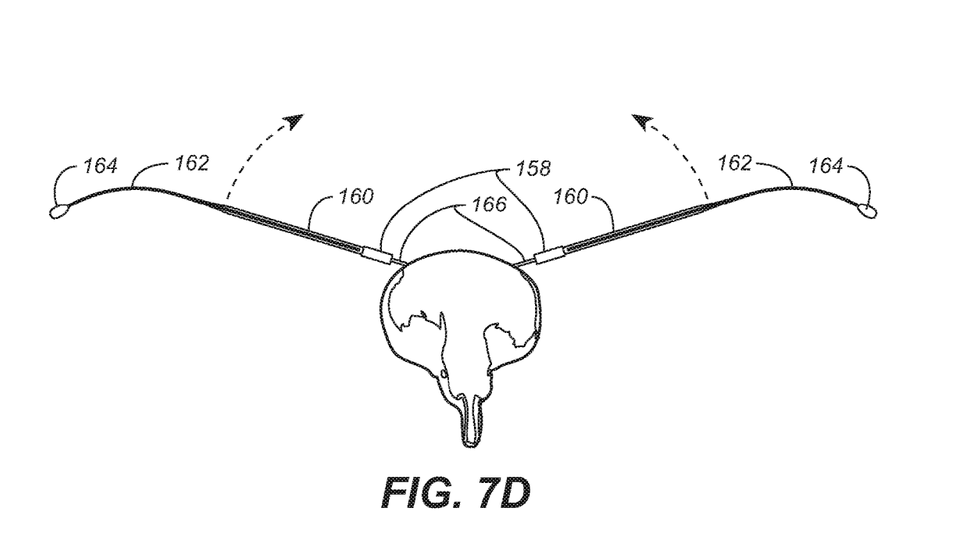
FIG. 7D is a front elevation view thereof showing the wings to the side of the body and continuing their upward movement.

Referring in addition now to FIGS. 2, 6A and 6B, it is seen that the oscillating mechanism 14 comprises an anchor plate 22 having two lateral extensions 24 and two top extensions 26. The two lateral extensions 24 extend to the side walls 28 of the decoy body 12. Fasteners 30 passing through lateral attachment holes 32 (see FIG. 6B) in the decoy body are threaded into fastener holes 34 in the lateral extensions 24. Similarly, the two top extensions 26 extend to the top wall 36 of the decoy body 12. Fasteners 30 passing through top attachment holes 38 (see FIG. 6A) in the top wall of the decoy body are threaded into fastener holes 40 in the top extensions 26. The oscillating mechanism is thereby firmly anchored to the decoy body 12. The support rod 18 is received in one of a plurality of downwardly oriented support rod receiving holes 42 located in the bottom end of the anchor plate 22. In one embodiment of the invention two support rod receiving holes 42A and 42B are provided having different angles for orienting the decoy body 12 at a selected angle to an underlying support surface. An access hatch 44 formed in the bottom side of the decoy body 12 (see also FIG. 6B) is closed with stopper 46. A rod opening 48 for support rod 18 is provided in stopper 46.

A motor 50 is attached to the back surface of anchor plate 22 with fasteners 54 such that the motor's drive shaft 56 extends through drive shaft opening 58 and forward of front surface 60. A controller 53 operatively attached to the motor, controls the speed of the motor 50. In one embodiment of the invention, the motor 50 is a 12V DC motor operating at speed between 150 and 220 rpm. Although in the illustrated embodiment, speed controller is shown mounted in the cavity of the decoy body, it may be located externally and may be wired to the motor or controlled remotely using predefined speed increments or a variable speed control.

Drive shaft 56 is received in the center aperture 62 of drive wheel 64 such that activation of motor 50 rotates drive shaft 56 and drive wheel 64. In one embodiment, drive shaft 56 has a polygonally shaped cross-section and center opening 62 has a corresponding shape to maximize transmission of rotational torque from the drive shaft 56 to the drive wheel 64. Drive shaft 56 is further secured in center aperture 62 by set screw 65 which when tightened in radial aperture 66 engages and retains drive shaft 56 in aperture 62. In one embodiment, a ferrule 65A is inserted in aperture 66 and set screw 65 is threaded into it.

Figure 3A:
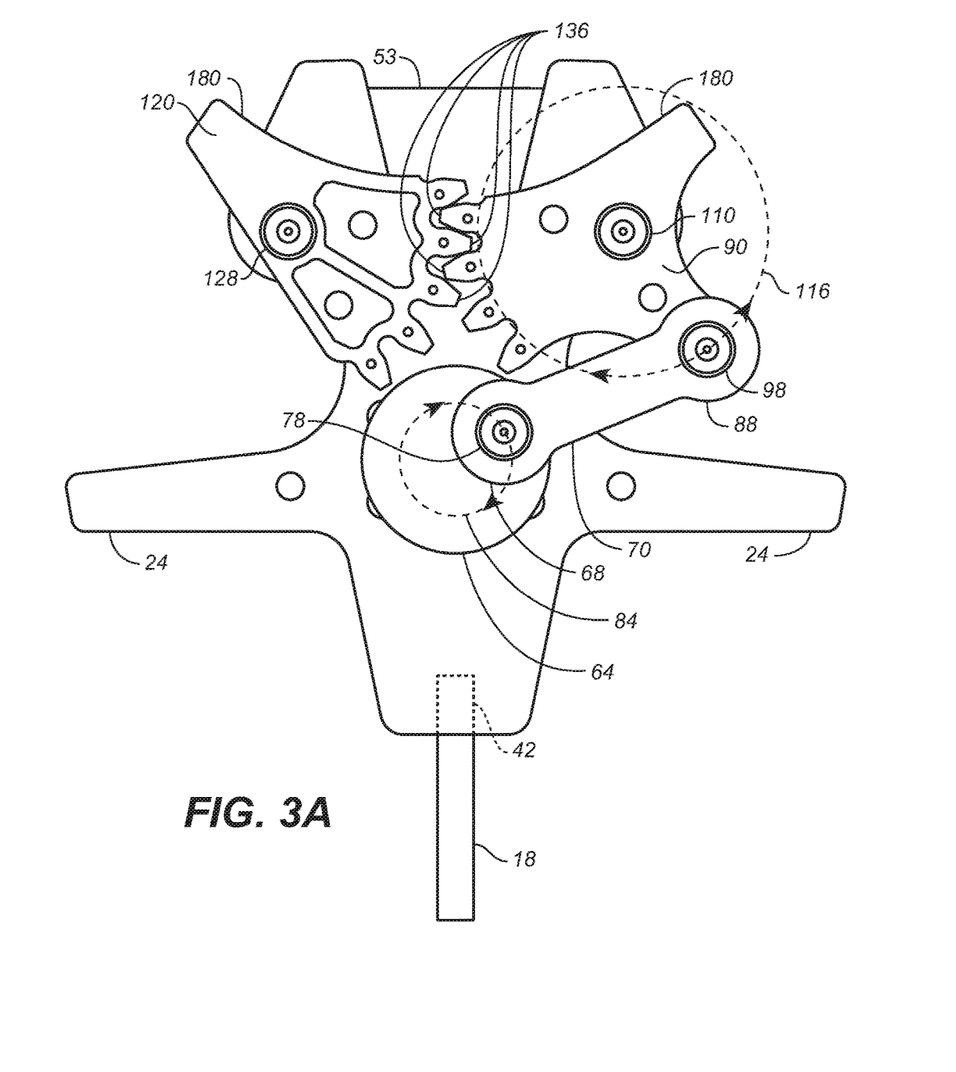
FIG. 3A is a front elevation view of the oscillation mechanism thereof.
Figure 3B:
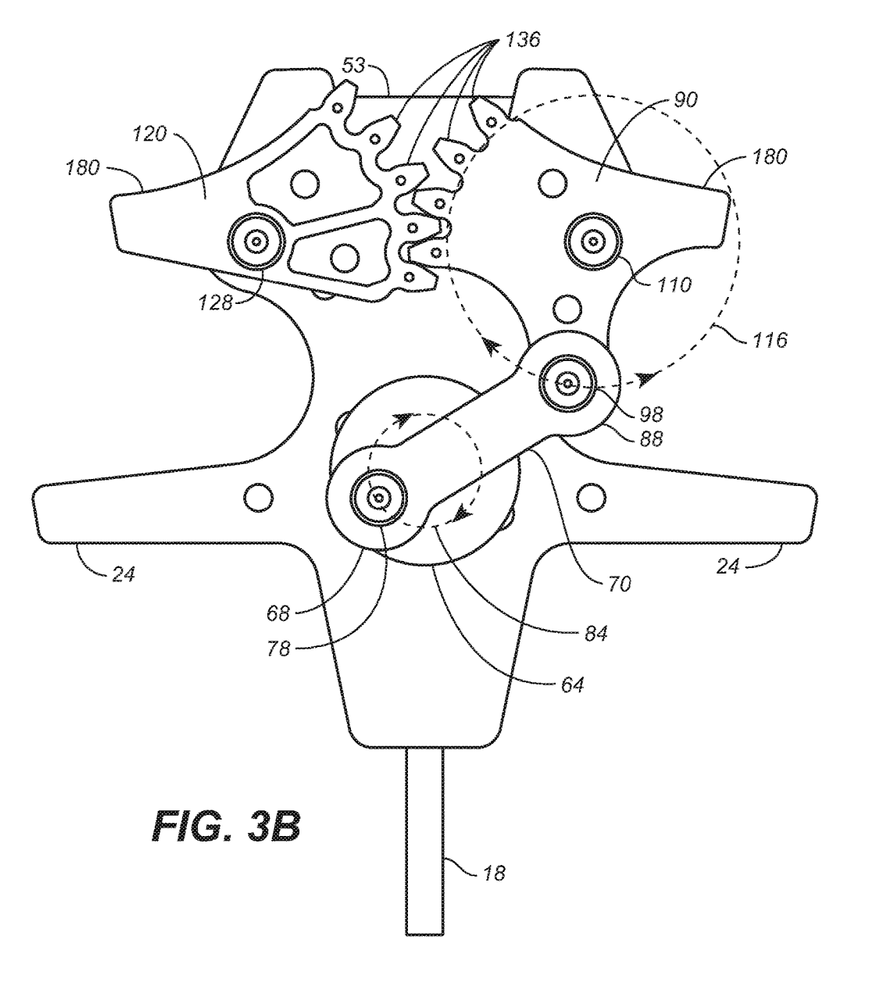
FIG. 3B is a front elevation view of the oscillation mechanism similar to FIG. 3A but wherein the drive wheel, drive link and wing gears have been moved to a different configuration.

With continuing reference to FIG. 2, it is seen that a first end 68 of drive link 70 is pivotally interconnected with drive wheel 64 via first end pivot pin 72. A forward end 74 of first end pivot pin 72 is secured in the first end aperture 76 of drive link 70 with fastener 78. A rear end portion 80 is pivotally received in eccentrically-located drive wheel pivot pin aperture 82, such that rotation of drive wheel 64 moves first end pivot pin 72 and the first end 68 of drive link 70 through a drive orbit 84 (shown in FIG. 3B) concentric with a drive shaft axis 86 formed by drive shaft 56.

The second end 88 of drive link 70 is similarly pivotally interconnected with first wing gear 90 via second end pivot pin 92. The forward end 94 of second end pivot pin 92 is secured in the second end aperture 96 of drive link 70 with fastener 98. The back end portion 100 is pivotally received in first wing gear distal pivot pin aperture 102.

First wing gear 90 in turn is pivotally interconnected with anchor plate 26 via first wing gear pivot pin 104, the forward end 106 of which is secured in first wing gear center pivot pin aperture 108 by fastener 110, and the rear portion 112 of which is pivotally received in first anchor plate pivot pin aperture 114. Thus, with additional reference to FIGS. 3A and 3B, it can be seen that the second end 88 of drive link 70 causes the second end pivot pin 92 and first wing gear distal pivot pin aperture 102 to reciprocate along an arc of orbit 116 as first wing gear 90 pivots about first wing gear pivot axis 118 formed about first wing gear pivot pin 104.

Referring again to FIG. 2, second wing gear 120 is pivotally interconnected with anchor plate 26 via second wing gear pivot pin 122, the forward end 124 of which is secured in second wing gear pivot pin aperture 126 by fastener 128, and the rear portion 130 of which is pivotally received in second anchor plate pivot pin aperture 132, such that second wing gear 120 pivots about a second wing gear pivot axis 134 formed by second wing gear pivot pin 122.

The inner portions of first and second wing gears 90, 120 have intermeshed gear teeth 136 such that rotational movement of first wing gear 90 causes corresponding counter-rotational movement of second wing gear 120. Thus, as drive wheel 64 rotates, the first end 68 of drive link 70 moves through orbit 84, which in turn moves the second end 88 of drive link 70 reciprocally through an arc of orbit 116 about first wing gear pivot axis 118, which causes first and second wing gears 90, 120 to pivot reciprocally about first wing gear and second wing gear pivot axes 118, 134, respectively.

Figure 4:
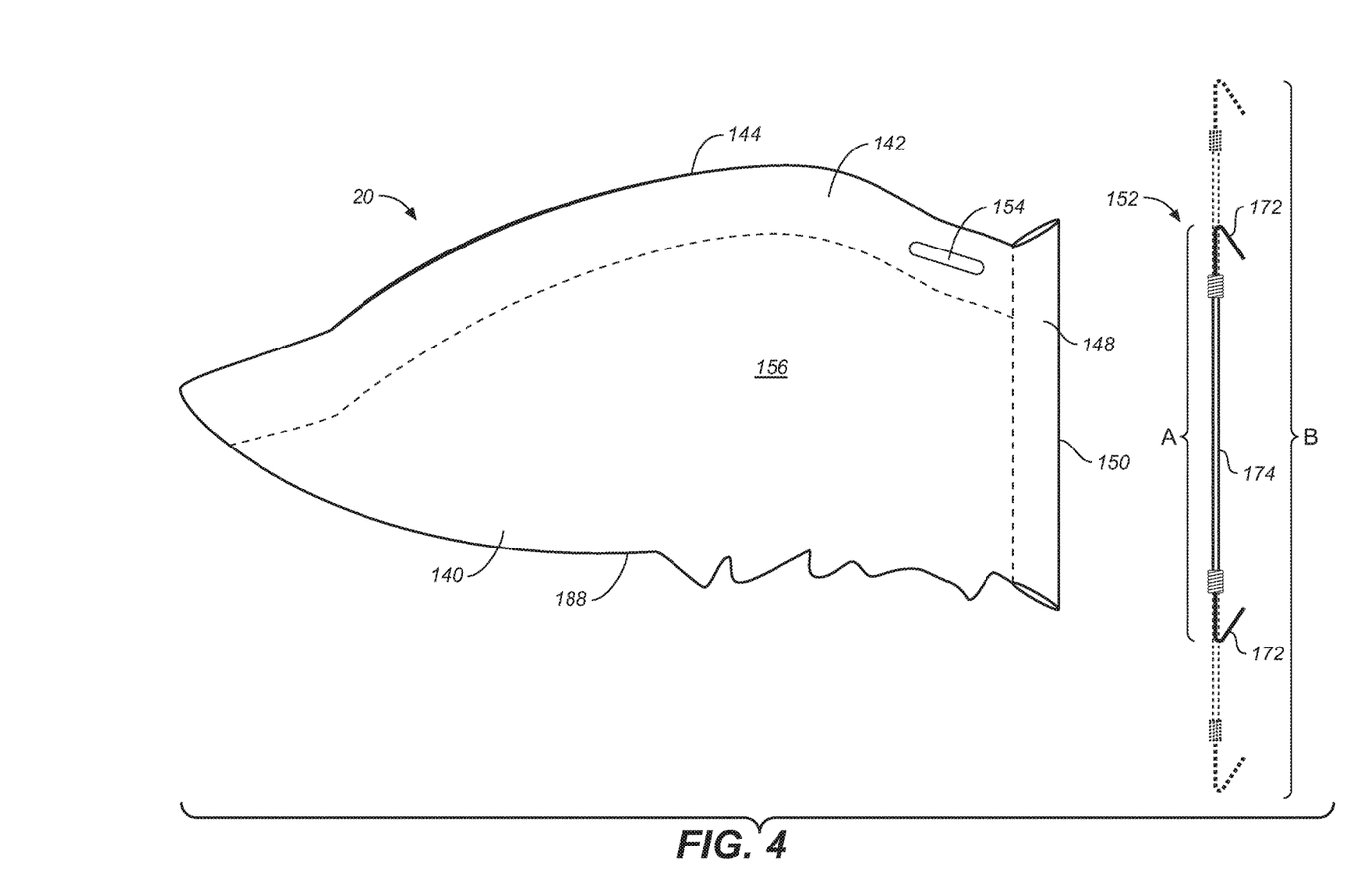
FIG. 4 is a bottom plan view of one of the wings thereof.
Figure 5A:
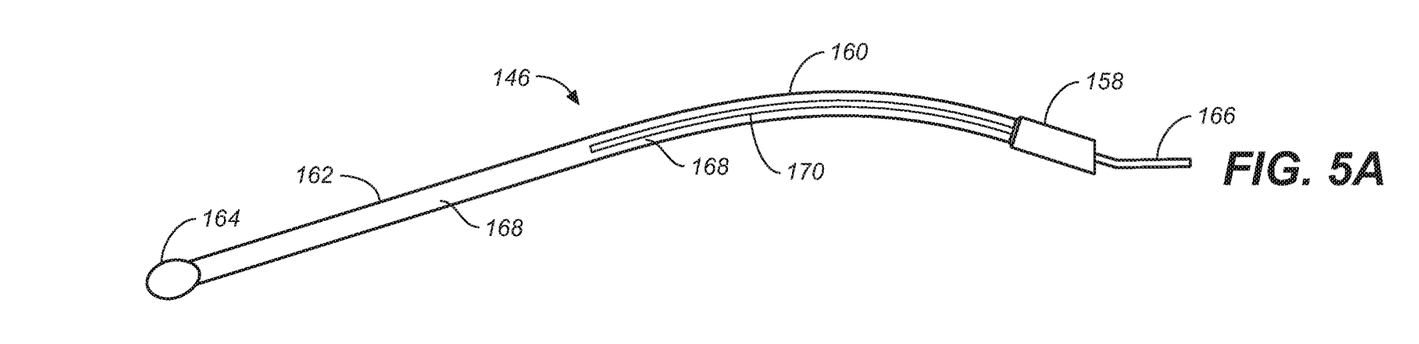
FIG. 5A is a front elevation view of the wing strut of one of the wings thereof.
Figure 5B:
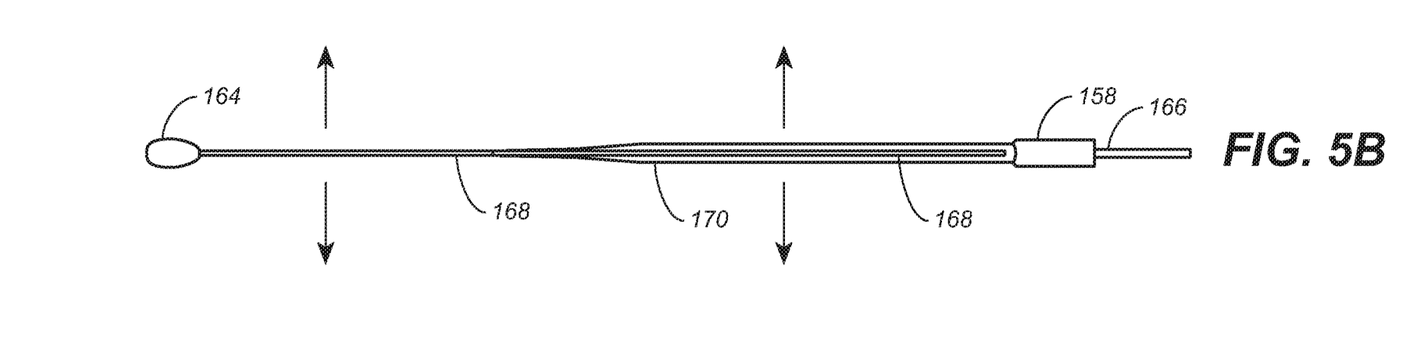
FIG. 5B is a plan view of the wing strut shown in FIG. 5A.

With reference to FIGS. 4, 5A and 5B, each of wings 20 comprises a wing panel 140 shaped to resemble the wing of a waterfowl in flight, a wing strut pocket 142 on its leading edge 144 for receiving a wing strut 146, and a fastener pocket 148 on its inner edge 150 for receiving a wing fastener 152. It is anticipated that the wing panel 140 will be manufactured from a lightweight, flexible material such as fabric. The leading edge 144, wing strut pocket 142, and wing strut 146 are shaped to closely resemble the leading edge of the wing of a waterfowl in flight. The wing strut 146 is introduced into the wing strut pocket 142 through wing strut slot 154 on the underside 156 of panel 140.

Each wing strut 146 comprises a base portion 158, a proximal portion 160 extending outwardly from the base portion, and a distal portion 162 extending outwardly from the proximal portion, to a tip 164. An attachment pin 166 extends inwardly from the base portion 158. The proximal and distal portions 160, 162 comprise an elongated flexible band 168 substantially disposed in a plane parallel with the plane of the wing panel. The proximal portion 160 includes reinforcing ribs 170 extending perpendicularly to band 168 to strengthen and stiffen the proximal portion of the wing. The tip 164 of the wing strut 146 is ovoid-shaped to provide a smoother edge profile to avoid snagging the wing strut pocket 142 when the wing strut is being inserted therein. In the illustrated embodiment, the tip 164 is enlarged perpendicularly to the wing plane in order to increase its weight. The increased weight at the end of the more flexible distal portion 162 of the wing strut 146 helps to create a whipping action that closely resembles the wing motion of a waterfowl as shown in FIGS. 7A-7D. The wing strut 146 may comprise polyethylene that has suitable strength and flexibility properties.

The wing fastener 152 for attaching the wing 20 to the decoy body 12 includes a pair of hooks 172 interconnected by an elastic cord 174 such that the hooks can be pulled apart from a relaxed state A to a biased state B as shown in FIG. 4. The wing fastener 152 is held in the fastener pocket 148 and when it is stretched to biased state B, the hooks 172 extend at least partly out of each end of the pocket.

With additional reference to FIGS. 6A and 6B, each pair of hooks 172 fits in a pair of spaced apart wing fastener holes 176 located on the top wall 36 of the decoy body 12, thereby holding the wing panel 140 to the decoy body. The wing strut 146 is attached to the oscillation mechanism 14 by inserting the attachment pin 166 through wing slots 178 in the side walls 28 of the decoy body 12 into a wing strut aperture 180 provided in each of the laterally-extending wing attachment arms 182 of the first and second wing gears 90, 120. Set screws 184 may optionally be used to further secure the attachment pins 166 in the wing strut apertures of wing gears 90, 120. In one embodiment, the attachment pin 166 has a polygonal cross-section and the wing strut aperture 180 has a correspondingly shaped polygonal cross-section such that the attachment pin 166, and hence the wing strut 146, is prevented from rotating within the aperture.

Thus, it can be seen that activation of motor 50 turns motor shaft 56 which then rotates drive wheel 64 thereby moving the first end 68 of drive link 70 through orbit 84 around drive shaft axis 86. Movement of first end 68 causes the second 88 of drive link 70 to reciprocate along an arc of orbit 116 around, and causes wing gear 90 to oscillate about, first wing gear pivot axis 118. Oscillation of first wing gear 90 causes second wing gear 120 to oscillate in a corresponding reverse swiveling motion, thereby moving attachment arms 182 up and down, thereby causing wings 20 to oscillate up and down. As each wing strut 146 moves up or down, the less flexible proximal portion 160 follows the motion of the wing gears 90, 120 more closely while the more flexible distal portion 162 follows at a delayed rate and swings more widely. Additionally, whereas the motion of the leading edge 144 of the wing panel 140 corresponds directly to the motion of the wing strut 146, the following edge 186 tracks the motion of the leading edge 144 at a delayed rate caused by the flexibility of the panel material, the added weight of wing tip 164, and air resistance. The combination of properties of the wing strut 146 and the wing panel 140 result in a sinuous bi-directional reciprocating motion developing radially from the inner edge 150 to the outer tip 188 of the wing panel, and front to back, from the leading edge 144 to the following edge 186 of the wing panel 140, that closely resembles the flapping of a bird's wings.

In addition to serving as a housing for oscillation mechanism 14, decoy body 12 acts as a weather barrier and muffles sounds generated from the motor 50 and moving components 64, 70, 90 and 120. Other sound reduction strategies may include internal insulation or damping materials disposed in the cavity 16 of the decoy body 12 or in or around motor 50.

There have thus been described and illustrated certain embodiments of a waterfowl decoy having oscillating wings according to the invention. Although the present invention has been described and illustrated in detail, it should be clearly understood that the disclosure is illustrative only and is not to be taken as limiting, the spirit and scope of the invention being limited only by the terms of the appended claims and their legal equivalents.

I claim:

1. A waterfowl decoy having oscillating wings comprising:
   an oscillation mechanism for disposition in the interior cavity of a waterfowl decoy body, said oscillation mechanism including:
      an anchor plate for fixed disposition in the interior cavity of a decoy body, said anchor plate having a front surface,
      a drive wheel rotatable about a drive shaft axis, and having a drive link first end pivot axis disposed eccentrically relative to said drive shaft axis,
      a drive link having first and second ends, said first end pivotally attached to said drive wheel about said drive link first end pivot axis,
      first and second wing gears pivotally attached to the front surface of said anchor plate about first wing gear and second wing gear pivot axes, said first and second wing gears intermeshed such that rotational movement of one causes counter-rotational movement of the other, said second wing gear having a drive link second end pivot axis disposed eccentrically relative to said first wing gear pivot axis, the second end of said drive link pivotally attached to said first wing gear about said drive link second end pivot axis, said drive link second end pivot axis movable in a drive link second end orbit about said first wing gear pivot axis,
   such that rotation of said drive wheel drives the first end of said drive link through an orbit concentric with said drive shaft axis, which in turn moves the second end of said link reciprocally through an arc of said drive link second end orbit, which in turn reciprocally rotates said first and second wing gears about said first and second wing gear pivot axes, which causes said first and second wing gears to move through arcs respectively concentric with said first and second wing gear pivot axes for causing a pair of wings extending from said first and second wing gears to oscillate in a reciprocal motion resembling the flapping of a bird's wings.

2. The waterfowl decoy having oscillating wings of claim 1 further comprising:
   said anchor plate having a back surface, a drive shaft opening, and at least one bottom support rod-receiving aperture for receiving a support rod for holding the decoy body above a support surface, and
   a motor attached to said back surface, said motor having a drive shaft rotatably received in said drive shaft opening and extending forward of said front surface,
   wherein said drive wheel is attached to and rotatable about said drive shaft forming thereby said drive shaft axis.

3. The waterfowl decoy having oscillating wings of claim 1 further comprising:
   said first and second wing gears each having a wing attachment arm for holding one of the pair of wings.

4. The waterfowl decoy having oscillating wings of claim 1 further comprising:
   a pair of wings extending from said first and second wing gears, each of said pair of wings forming a wing plane for orientation substantially parallel to the decoy body, each said wing including a wing strut curved in the shape of the leading edge of a bird wing during flight, said wing strut having a base portion, a proximal portion extending from said base portion, and a distal portion extending from said proximal portion, said proximal and distal portions each comprising an elongated band parallel with said wing plane, said proximal portion includes one or more reinforcing ribs extending perpendicularly from said band such that said distal portion is more flexible than said proximal portion in directions perpendicular to said wing plane.

5. A waterfowl decoy having oscillating wings comprising:
   an oscillation mechanism for disposition in the interior cavity of a waterfowl decoy body, said oscillation mechanism including:
      an anchor plate for fixed disposition in the interior cavity of a decoy body, said anchor plate having a front surface, a back surface, a drive shaft opening, and at least one bottom support rod-receiving aperture for receiving a support rod for holding the decoy body above a support surface,
      a motor attached to said back surface, said motor having a drive shaft rotatably received in said drive shaft opening and extending forward of said front surface,
      a drive wheel attached to said drive shaft such that said drive wheel is rotatable about a drive shaft axis formed by said drive shaft,
      a drive link having first and second ends, said first end pivotally attached to said drive wheel about a drive link first end pivot axis that is formed on said drive wheel eccentrically relative to said drive shaft axis,
      first and second wing gears pivotally attached to the front surface of said anchor plate about first wing gear and second wing gear pivot axes, said first and second wing gears intermeshed such that clockwise movement of one causes counter-clockwise movement of the other, said first and second wing gears each having a wing attachment arm for holding one of a pair of wings, the second end of said drive link pivotally attached to said first wing gear about a drive link second end pivot axis disposed eccentrically relative to said first wing gear pivot axis, said drive link second end pivot axis movable in a drive link second end orbit that is concentric with said first wing gear pivot axis,
   such that rotation of said drive wheel drives the first end of said drive link through an orbit concentric with said drive shaft axis, which in turn moves the second end of said link reciprocally through an arc of said drive link second end orbit, which in turn reciprocally rotates said first and second wing gears about said first and second wing gear pivot axes, which causes the wing attachment arms of said first and second wing gears to move through arcs respectively concentric with said first and second wing gear pivot axes to cause a pair of wings to oscillate in a reciprocal motion resembling the flapping of a bird's wings.

6. The waterfowl decoy of claim 5 further comprising:
   a decoy body having the shape of a waterfowl, said body having a longitudinal dimension, an interior cavity, opposite side walls, and a top wall, said side walls each having a wing opening for receiving one of a pair of wings, and
   said anchor plate having opposite lateral extensions and one or more top extensions, said lateral extensions affixed to the side walls of said decoy body and said said oscillation mechanism in the interior cavity of said decoy body.

7. The waterfowl decoy of claim 5 further comprising:
said decoy body having a bottom access opening,
a support rod received in one of said at least one bottom support rod-receiving apertures and extending through said bottom access opening.

8. The waterfowl decoy of claim 7 further comprising:
a closure for sealing said bottom access opening, said closure having a support rod opening,
said support rod received in said support rod opening.

9. The waterfowl decoy of claim 8 wherein:
said at least one bottom support rod-receiving aperture comprises a plurality of bottom support rod-receiving apertures, each of said apertures disposed at a different angle for mounting a decoy above a support surface at a selected one of a plurality of angles.

10. The waterfowl decoy of claim 5 further comprising:
the wing attachment arm of each of said first and second wing gears having an outwardly oriented wing-receiving opening, and
a pair of wings each of which is received in one of said wing-receiving openings.

11. The waterfowl decoy of claim 10 wherein:
each of said pair of wings includes a wing strut curved in the shape of the leading edge of a bird wing during flight, said wing strut having a base portion, a proximal portion extending from said base portion, a distal portion extending from said proximal portion, and an attachment pin extending inwardly from said base portion for insertion into the wing-receiving opening of each of said first and second wing gears, said wing-receiving openings having a polygonal cross-section, and said attachment pins having a corresponding polygonal cross-section for fixing said wing in an oscillating wing plane that is substantially parallel to the longitudinal dimension of a waterfowl decoy body in which said oscillation mechanism is disposed.

12. The waterfowl decoy of claim 11 wherein:
said distal portion is more flexible than said proximal portion.

13. The waterfowl decoy of claim 12 wherein:
said proximal and distal portions each comprise an elongated band parallel with said wing plane, and
said proximal portion includes one or more reinforcing ribs extending perpendicularly from said band such that said distal portion is more flexible than said proximal portion in directions perpendicular to said wing plane.

14. The waterfowl decoy of claim 7 wherein:
said strut comprises nylon.

15. The waterfowl decoy of claim 11 wherein:
each of said pair of wings includes a flexible wing panel formed to resemble a bird wing, said panel having a proximal edge, a distal end opposite said proximal edge, and a leading edge extending between said proximal edge and said distal end,
said leading edge having a wing strut-receiving pocket and an opening allowing insertion of said wing strut into said pocket,
said proximal edge including a fastener for removably attaching said wing to a decoy body.

16. The waterfowl decoy of claim 15 wherein:
the proximal edge of said wing panel includes a fastener slot,
said fastener includes a pair of hooks elastically interconnected such that said pair of hooks can be stretched apart from a relaxed configuration to a taut configuration, in said taut configuration said hooks for insertion in a pair of spaced apart apertures in the decoy body for releaseably holding said wing to the decoy body.

17. A waterfowl decoy having oscillating wings comprising:
an oscillation mechanism for disposition in the interior cavity of a waterfowl decoy body, said oscillation mechanism including:
an anchor plate for fixed disposition in the interior cavity of a decoy body, said anchor plate having a front surface, a back surface, a drive shaft opening, and at least one bottom support rod-receiving aperture,
a support rod received in one of said one bottom support rod-receiving apertures for holding the decoy body above a support surface,
a motor attached to said back surface, said motor having a drive shaft rotatably received in said drive shaft opening and extending forward of said front surface,
a drive wheel attached to said drive shaft such that said drive wheel is rotatable about a drive shaft axis formed by said drive shaft,
a drive link having first and second ends, said first end pivotally attached to said drive wheel about a drive link first end pivot axis that is formed on said drive wheel eccentrically relative to said drive shaft axis,
first and second wing gears pivotally attached to the front surface of said anchor plate about first wing gear and second wing gear pivot axes, said first and second wing gears intermeshed such that clockwise movement of one causes counter-clockwise movement of the other, said first and second wing gears each having a wing attachment arm, the second end of said drive link pivotally attached to said first wing gear about a drive link second end pivot axis disposed eccentrically relative to said first wing gear pivot axis, said drive link second end pivot axis movable in a drive link second end orbit that is concentric with said first wing gear pivot axis,
a pair of wings extending outwardly from the wing attachment arms of said first and second wing gears,
such that rotation of said drive wheel drives the first end of said drive link through an orbit concentric with said drive shaft axis, which in turn moves the second end of said link reciprocally through an arc of said drive link second end orbit, which in turn reciprocally rotates said first and second wing gears about said first and second wing gear pivot axes, which causes the wing attachment arms of said first and second wing gears to move through arcs respectively concentric with said first and second wing gear pivot axes thereby causing said pair of wings to oscillate in a reciprocal motion resembling the flapping of a bird's wings.

18. The waterfowl decoy having oscillating wings of claim 17 further comprising:
each of said pair of wings establishing a wing plane, each of said pair of wings including a wing strut disposed in said wing plane and curved in the shape of the leading edge of a bird wing during flight, said wing strut having a base portion, a proximal portion extending from said base portion, a distal portion extending from said proximal portion, and an attachment pin extending inwardly from said base portion for insertion into the wing-receiving opening of each of said first and second wing gears, said proximal and distal portions each comprising an elongated band parallel with said wing plane, said proximal portion including one or more reinforcing ribs extending perpendicularly from said band such that said distal portion is more flexible than said proximal portion in directions perpendicular to said wing plane,
such that during oscillation of said wings, the distal portions thereof noticeably flex more that the proximal portions thereof thereby resembling the flapping motion of a bird's wings in flight.

\* \* \* \* \*